United States Patent [19]

Patterson

[11] Patent Number: 4,709,416
[45] Date of Patent: Nov. 24, 1987

[54] LASER BIAS CURRENT STABILIZATION FOR BURST MODE FIBER OPTIC COMMUNICATION SYSTEM

[75] Inventor: David R. Patterson, Yardley, Pa.

[73] Assignee: RCA Corporation, Princeton, N.J.

[21] Appl. No.: 832,537

[22] Filed: Feb. 24, 1986

[51] Int. Cl.⁴ .............................................. H04B 9/00
[52] U.S. Cl. .................................. 455/609; 455/607; 455/613; 455/618
[58] Field of Search ............... 455/613, 606, 607, 617, 455/618, 609; 372/31, 38, 26, 28; 370/3, 4

[56] References Cited

U.S. PATENT DOCUMENTS

| 4,009,385 | 2/1977 | Sell . | |
|---|---|---|---|
| 4,019,048 | 5/1977 | Maione et al. . | |
| 4,277,846 | 7/1981 | Chem | 455/611 |
| 4,295,226 | 10/1981 | Dombrowski | 455/618 |
| 4,355,395 | 10/1982 | Salter et al. | 372/38 |
| 4,359,773 | 11/1982 | Swartz et al. | 372/26 |
| 4,385,387 | 5/1983 | Trimmel | 372/29 |
| 4,399,566 | 8/1983 | Roullet et al. | 455/613 |
| 4,412,331 | 10/1983 | Chapman | 372/29 |
| 4,523,089 | 6/1985 | Maeda et al. | 250/205 |
| 4,558,465 | 12/1985 | Siegel et al. | 455/609 |
| 4,611,352 | 9/1986 | Fujito et al. | 455/609 |

FOREIGN PATENT DOCUMENTS 2730056 1/1979 Fed. Rep. of Germany .

Primary Examiner—Robert L. Griffin
Assistant Examiner—Leslie Van Beek
Attorney, Agent, or Firm—Harley R. Ball; Marvin Snyder

[57] ABSTRACT

A fiber-optic communication system for data bursts includes a plurality of nodes, each including a laser diode transmitter. In order to reduce the noise floor of the system, each laser diode receives bias current only when it is transmitting data. Due to the propagation delay between nodes, there is a dead time between data bursts received by each node during which no data signals are received. The bias current of the laser diode is adjusted following each data transmission, so that the light attributable to laser operation during the setting of bias is received during the dead time. The adjustment is accomplished by stepping an up-down counter by one clock pulse following transmission of each data burst.

14 Claims, 22 Drawing Figures

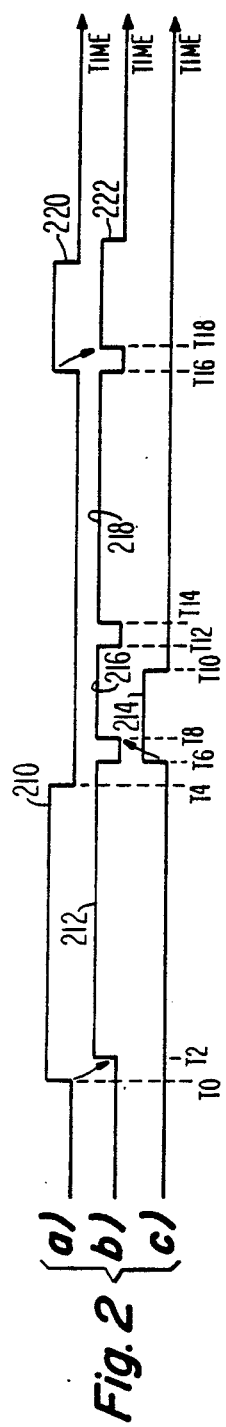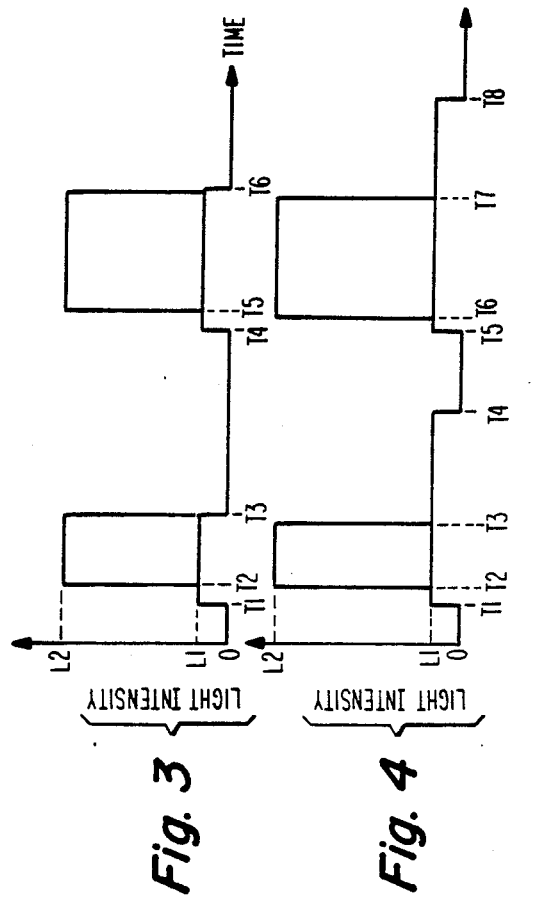
Fig. 2
Fig. 3
Fig. 4

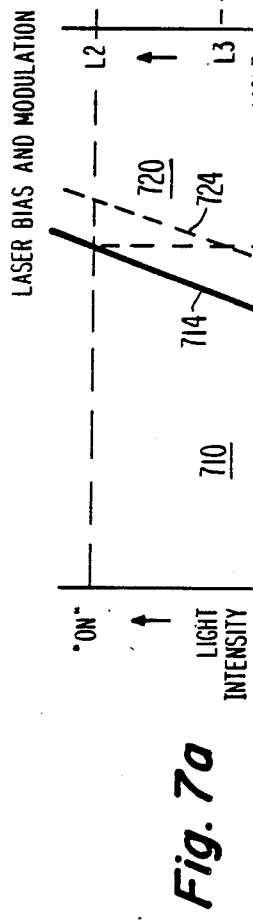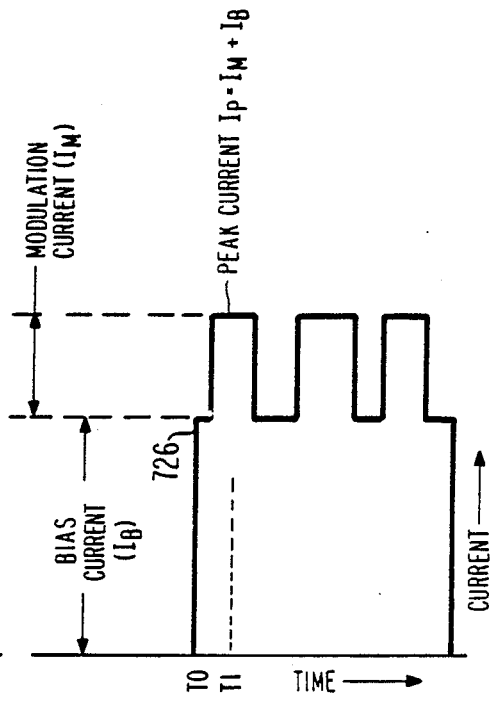
Fig. 7a
Fig. 7b
Fig. 7c

LASER BIAS CURRENT STABILIZATION FOR BURST MODE FIBER OPTIC COMMUNICATION SYSTEM

This invention relates to arrangements for establishing bias current for laser diodes which are used for burst mode data communications in local area fiber optic communication networks. In particular, the invention establishes the bias current in the interval between the end of data transmission by one node and the beginning of data transmission by another node.

BACKGROUND OF THE INVENTION

Local area networks (LAN) are communication networks operating on a common bus or which have a common central combining point, which provide intercommunications among three or more data terminals, stations or nodes. Such a network might be used, for example, for intercommunications among computer terminals in a building or on a military installation. In general, a LAN may provide signal transmission by two-wire transmission lines (as, for example, a telephone line), or for higher data rates may use coaxial cable. Significant disadvantages of coaxial cable are weight, volume and cost, which become important factors when the number of nodes to be interconnected or their separation is large. Furthermore, coaxial cable has substantial attenuation, which becomes a problem when the distances between nodes are substantial. The attenuation of coaxial cables may require the use of repeater amplifiers, which add to the cost and complexity of the communication system. Fiber optic (FO) communication networks have received increasing attention because of their advantages by comparison with coaxial cable. Fiber optic cables have the potential for being low in cost, and are light in weight and small in volume. Furthermore, the attenuation of fiber optic cables is much lower than that of coaxial cable, thereby allowing longer runs without repeaters. A further advantage of fiber optic cables over coaxial cables lies in the bandwidth, which may be greater than that of coaxial cable, thereby allowing a single fiber optic cable to carry more information than a coaxial cable. A yet further advantage of fiber-optic cables is low susceptibility to electromagnetic radiation.

In a fiber optic communication system, the computer or other source and sink of data at any node is coupled to the fiber optic bus or cable by an optical receiver with a photodetector for receiving signals, and by an optical transmitter with an optical source for transmission. The photodetector receives light signals from the fiber optic bus and converts the signals into electric signals which can be used by the computer. The optical transmitter receives electrical signals from the source of data and converts these signals into pulses of light which are propagated along the fiber optic bus.

The fiber optic transmitter may be a solid state light emitting device. The light emitting devices commonly available at the current state of the art are the light emitting diode (LED) and the laser diode. There are structural differences between LEDs and laser diodes which are not important to the invention, but functionally the differences include the fact that a LED is a relatively low power, low data rate optical source by comparison with a laser diode. For those situations in which a LAN has a high data rate, covers long distances, or has a large number of nodes (thereby requiring dividing of the transmitted light energy into many parts), the laser diode is preferred as an optical transmitter.

A laser diode has a characteristic of light output versus drive current which includes a first portion in which the light emitted as a function of drive current increases relatively slowly from zero light to a first level of light which occurs at a knee point. The characteristic also includes a second portion in which the light emitted as a function of drive current increases relatively quickly for drive currents exceeding the drive current corresponding to the knee point. The value of the maximum drive current may be established by considerations such as heating of the diode by the drive current and the resulting level of reliability. In general, for good reliability the maximum operating drive current is much less then the maximum current which the light emitting device can withstand. The data being communicated by the local area network is ordinarily in the form of binary pulses having logic HIGH and LOW levels.

In principle, the logic HIGH level of the binary pulses turn the diode to an ON condition by a forward-bias current which causes light output which represents the logic HIGH level of the binary pulse, and the device is deenergized (deprived of current) and therefore produces no light output in order to represent a logic LOW level. For communications at low data rates this simple arrangement may be satisfactory, although the pulses may have a delay in the initiation of the optical output relative to the current drive because of delays in the conversion process of electron injection to optical (photon) emission. This in turn affects pulse symmetry and fidelity. For high data rate communications, however, timing considerations require that the transmitted light pulses have relatively well defined symmetry and overall pulse fidelity. It is known to bias each of the light emitting devices to the knee current with a direct current bias which represents a logic LOW level, and to superimpose upon the bias current a further modulating current which represents the logic HIGH level of the data to be transmitted. Thus, a logic zero level produces a light output from the light emitting device corresponding to the light output at the knee current, and the light output representing logic high level is greater than the knee current light output.

When there are a large number of nodes or stations associated with the local area network, and each node includes a light emitting device coupled to a fiber optic (FO) bus, a system problem arises if all of the light emitting devices are biased at the knee current. Each light emitting device when biased to the knee current emits a finite amount of light. Thus, the fiber optic bus has a continuous illumination attributable to the knee current of the light emitting device at each node. This illumination is a background illumination upon which the illumination representing the data to be transmitted is superimposed. The likelihood of being able to detect the desired signal decreases as the noise floor rises as a result of the background illumination. This, in turn, may reduce the maximum length of run of fiber optic cable which can be used before cable attenuation reduces the signal to an undesirably low level.

Certain topologies of local area networks allow only one node to transmit on the fiber optic bus at any one time, i.e. they use time division multiplexing of the optical bus. Each node is controlled so that it transmits at a time when the fiber optic bus is not in use by other nodes, because use by more than one transmitting node might cause the logic LOW level transmitted by a first node to be masked by the logic HIGH level transmitted by a second node, resulting in destruction of information. This scheduling of transmission is achieved in many ways known in the art, among which are "token passing" protocols in which the node which is currently transmitting, upon completion of its normal message, may transmit a signal representing the end of transmission, thereby advising the next node allowed to transmit that transmissions may begin.

U.S. Pat. No. 4,558,465 issued Dec. 10, 1985, in the name of Siegel et al. recognizes that in a communication system using light emitting devices which are biased to a knee, the cumulative light on the system represents a noise background which adversely affects communication. According to the Siegel et al. arrangement, the knee-point bias of all optical transmitters is turned off except for the one currently transmitting. When transmission is about to begin from any node, the optical transmitter at that node is biased to its knee current, and the bias is maintained for the duration of the data transmission. The data transmission is accomplished by excursions of a modulating current above the knee current. This effectively eliminates residual light on the system, and reduces system noise to improve communications, while at the same time providing desirable pulse fidelity.

The light versus bias current characteristic of laser diodes changes as a function of temperature and also of aging of the device. These changes are manifested for the most part as a change in the magnitude of the bias current at the knee between the two regions of the characteristic. Generally, the slope of light output versus bias current remains the same in the regions above and below knee point, and only the magnitude of the current at the knee point changes. Adjustment of the bias current may be accomplished by slowly increasing the bias current from zero bias current, while monitoring the light output of the light emitting device. The bias current required to obtain a predetermined light output is the knee current. In a communications system including only a single continuously operating data transmitter, it is clear that communications must be interrupted to set the bias current in this manner.

Some prior art arrangements control the bias current during data transmission by comparing the light output of logic high and logic low levels of the data with a predetermined standard, which may be the average light output. When burst data communications are involved, data bits of the burst may not be properly controlled with such a scheme because the average light output cannot be properly established due to the short duty cycle of the burst. Also, when the data rate is very high, as for example 500 Megabits/second at the current state of the art, it is difficult to sample during the data pulse to establish the amount of light existing during a logic high or low level.

In the aforementioned Siegel et al. arrangement, a control logic arrangement excites the light emitting device with a first excitation current which increases from zero. The light output of the device is monitored until the light emitted reaches the intensity representing the knee of the operating characteristic curve. A storage logic is provided for storing the magnitude of the knee current so that is can be reproduced. The knee current is then maintained constant during further bias adjustment. A second logic control circuit further excites the diode with a further increasing current until the diode emits the desired light intensity corresponding to the maximum bias. Information relating to the maximum bias current is stored so that it can also be reproduced. This completes the bias current adjustment. Switching logic is coupled to the source of data and to the logic circuits which switches the bias between the knee current bias and the maximum current bias in response to logic LOW and logic HIGH levels of the data. During the adjustment interval, the light emitting device emits the maximum amount of light. This may interfere with the communications on the network if the optical transmitter remains coupled to the fiber optic bus. Interruption of operation is required if the optical transmitter is disconnected from the fiber optic bus.

A fiber optic transmission system is desired in which the bias current of the light emitting devices may be adjusted without interrupting operation, and which is capable of use in high data rate burst mode communications systems.

SUMMARY OF THE INVENTION

A fiber optic communications system provides communication between any one of a first plurality of transmitters and any one of a second plurality of receivers. Communication among nodes (each including a transmitter and receiver) is by means of data bursts. A light emitting device associated with each transmitter produces light which is amplitude modulated with data. Each light emitting device has a light versus drive current characteristic which includes a first region extending from zero current to a knee current in which the incremental light output in response to an incremental drive current is relatively small, and a second region which extends from the knee current to a maximum drive current in which the incremental light output in response to an an incremental drive current is relatively great. The knee current may change. A controllable bias current generator is associated with each transmitter and is coupled to the light emitting device for generating knee current in the light emitting device for biasing the light emitting device to the threshold of emission. This results in those light emitting devices which are not currently transmitting data producing light in response to the knee currents which raises the residual light level of the fiber optic communications system and undesirably increases its noise floor. A modulator coupled to the light emitting device of each transmitter and responsive to a local source of data modulates the drive current between the knee current and a maximum drive current in response to a logic level of the data to be transmitted. An inhibitor at each transmitter is coupled to the controllable bias current generator and to the source of data for inhibiting the controllable bias current generator for an interval lying between the data bursts transmitted by the associated transmitter. This has the desirable effect of reducing the noise floor of the system. According to the invention, the interval in which each inhibitor inhibits the controllable bias generator has a shorter duration than the interval between data bursts, thereby defining an idling time during which the light emitting device is energized with knee current, but data is not being transmitted. Further according to the invention, a bias control arrangement associated with each transmitter is coupled to the controllable bias current generator and to the inhibitor for setting the value of the bias current during the idling time.

DESCRIPTION OF THE DRAWING

FIGS. 2a, 2b and 2c are time diagrams illustrating the effect of system time delays;

FIG. 3 is a time diagram illustrating the temporal relationship of laser diode bias current and data current according to the prior art;

FIG. 4 is a time diagram illustrating the temporal relationship of bias current and data current according to the invention;

FIGS. 7a, 7b and 7c illustrate the light output versus bias and modulation drive currents of a laser diode which may be used in the arrangement of FIG. 6;

DETAILED DESCRIPTION OF THE INVENTION

Figure 1:
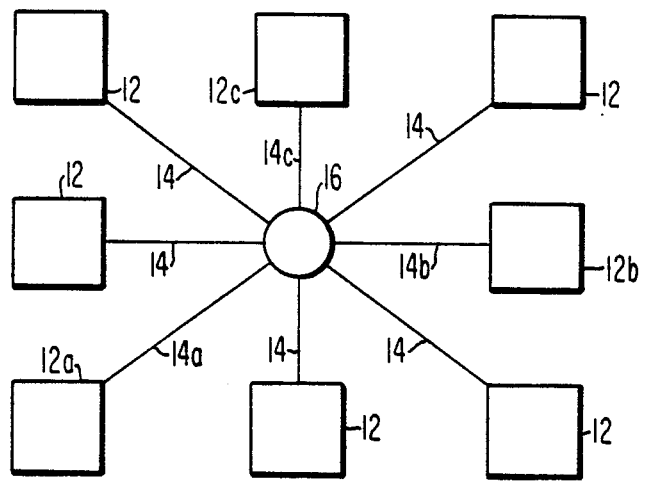
FIG. 1 is a block diagram of a local area network including a central combining point and a plurality of peripheral nodes.

FIG. 1 illustrates in block diagram form a local area network (LAN) 10 have a central optical combining point 16. In FIG. 1, a plurality of nodes or stations 12, three of which are designated as 12a, 12b and 12c, are connected by way of fiber optic cables 14 with central combining point 16. Central combining point 16 represents an interconnection of the various fiber optic cables 14, so that a signal propagating towards point 16 along a fiber optical cable such as cable 14a is coupled to all the other fiber optic cables 14. This type of coupling may be accomplished as known by a central combining point 16 consisting of a star coupler. In actual practice, each fiber optic cable 14 may consist of a single optical fiber which carries signals bidirectionally, or a pair of optical fibers each carrying signals undirectionally.

As known, a finite time is required for signals originating at a node such as node 12a to propagate along fiber optic (FO) cable 14a to central combining point 16, and from point 16 along further fiber optic cables such as cable 14c to other nodes such as 12c. In normal system operation, a node such as 12c does not begin to transmit until completion of the transmission by the previously transmitting node, such as node 12a. Thus, node 12c may begin transmission when it has received the last portion of the previous transmission, which originated from node 12a. Due to the propagation delay in cables 14a and 14c, node 12c does not begin transmission until a time delayed from the end of transmission by node 12a by the delay attributable to FO cables 14a and 14c. Other nodes, such as node 12b, do not receive the leading edge of a signal transmitted from node 12c until a time delayed from the time of receipt of the lagging edge of the transmission from node 12a by twice the propagation delay attributable to FO cable 14c. The timing is illustrated in FIGS. 2a-2c, in which the transmission of data by node 12a is represented by a pulse 210 of FIG. 2a occurring in an interval T0–T4. Transmission 210 is received at node 12c of FIG. 1 in the interval T2–T6, as illustrated by 212 of FIG. 2b. The intervals T0–T2 and T4–T6 represent the propagation delay attributable to fiber optic cables 14a and 14c. At time T6, node 12c receives the last portion of the transmission which originated with node 12a. In an ideal case in which node 12c requires no processing time to recognize the end of the transmission from node 12a, node 12c begins its own transmission at time T6, as illustrated by 214 of FIG. 2c. Node 12c transmits in the interval T6–T10, and the transmissions are received by node 12a (and by other nodes) in the interval T8–T12, as illustrated by 216 of FIG. 2b. The interval T6–T8 represents a time during which no node receives signal, and is attributable to the path lengths of the FO cables of the local area network. A similar time in which no signal is received occurs in interval T12–T14 between transmission 216 and a further transmission 218, attributable to some node other than nodes 12a and 12b. A further transmission by node 12a is represented by 220 of FIG. 2a, which is received by all nodes as 222 of FIG. 2b. As so far described, the path lengths between central combining point 16 and the various nodes 12 have been indicated as being equal. Those skilled in the art will understand that the delays experienced will depend upon the distances between central combining point 16 and the particular node 12 in question, but the exact value of the delay is not important to the invention.

FIG. 3 illustrates an amplitude-versus-time plot of the magnitude of the light output (light intensity) of a transmitter such as transmitter 12 of the arrangement of FIG. 1, as described in the aforementioned Siegel et al. patent. In FIG. 3, amplitudes L1 and L2 represent the light output of a laser diode. At time T1, the light output increases from zero to a level L1 and remains at level L1 until a time T2. In the interval T2–T3, data is transmitted in the form of excursions of the light level between levels L1 and L2. At or near time T3 the data transmission ends, and the light level drops once again to zero. Also illustrated in FIG. 3 is a further burst transmission including a transition of the light level to light level L1 at time T4, and data transmission in the interval T5–T6, also in the form of excursions between light levels L1 and L2. FIG. 4 illustrates corresponding transmissions from a node according to the method of invention. As illustrated in FIG. 4, the light transmitted from a node increases from a value of zero to $L_1$ at a time T1, and remains at level L1 until later time T2. Data transmission in the form of excursions of the light level from L1 to L2 occur in the interval T2–T3. During a further interval T3–T4 after the end of the burst of data, the transmitted light remains at level L1. Interval T3–T4 represents a time occurring between receipt of data bursts by the nodes 12 of FIG. 1. This time corresponds to intervals T6–T8, T12–T14 and T16–T18 of FIG. 2b. As described below, this interval is used at the node which has just completed transmission of data to readjust the bias level of its laser diode. Because the adjustment occurs when no signals are received by other nodes, data transmissions are not affected. A further light transmission from the same transmitter occurs in the interval T5–T8 in FIG. 4. The interval T4–T5 represents an interval in which the light output is inhibited in order to reduce the noise floor of the system.

Figure 5:
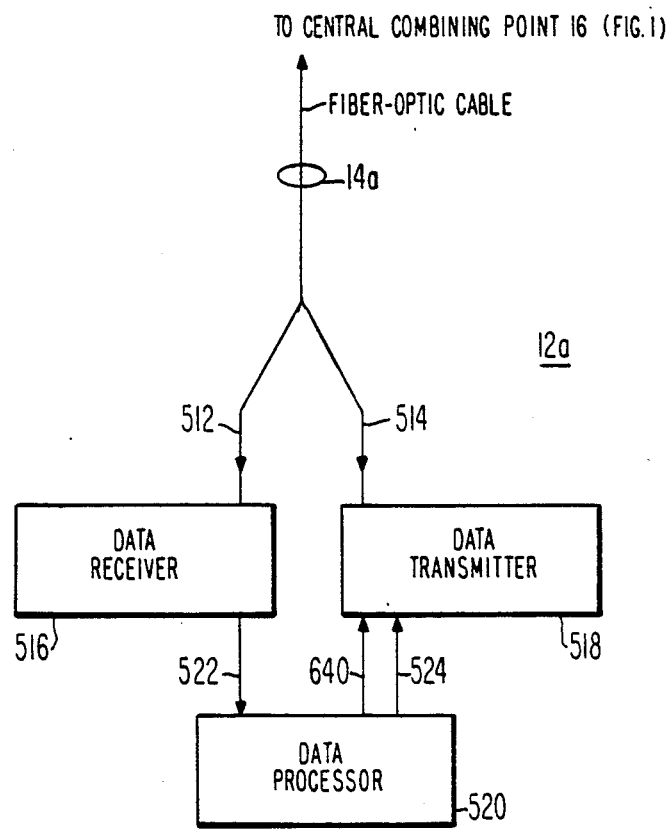
FIG. 5 is a block diagram of a data terminal or node adapted for use in the local area network of FIG. 1.

FIG. 5 is a block diagram of node 12a of FIG. 1, which is representative of all nodes 12. In FIG. 5, the end of fiber optic (FO) cable 14a remote from optical combining point 16 (FIG. 1) is seen to consist of two separate fiber optic cables 512 and 514. A data receiver 516 is coupled to FO cable 512, and a data transmitter 518 is coupled to FO cable 514. The data received by receiver 516 over FO cable 512 is coupled to a data process or user illustrated as 520, which is associated with node 12a. Data processor 520 processes received data and generates data to be transmitted to the other nodes. The data is coupled from data processor 520 to transmitter 518 for transmission by way of a conductor 524. Control information is coupled by way of a conductor 640. As known, the data may be in the form of serial or parallel binary data. Those skilled in the art will realize that parallel data is carried by multiple conductor sets. For simplicity of description, all conductor sets are described as though they were single conductors.

Figure 6:
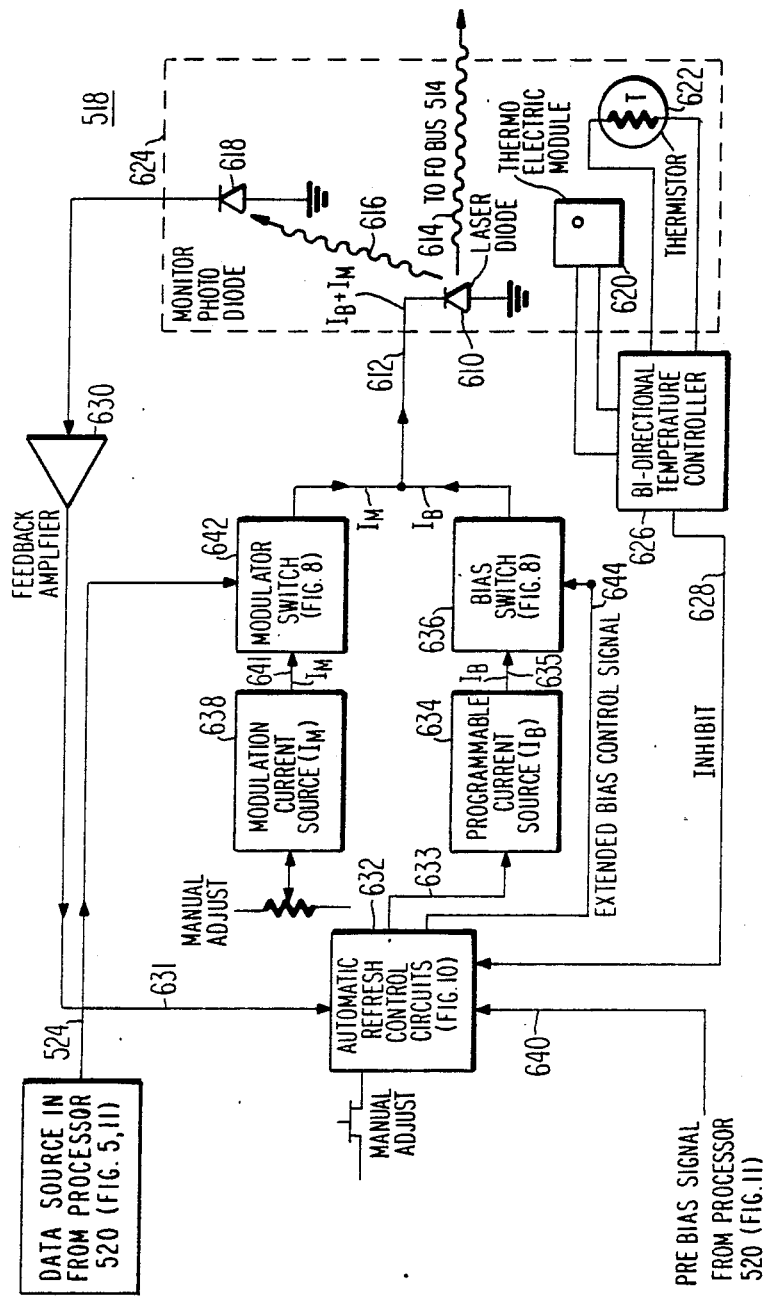
FIG. 6 is block diagram of a data transmitter according to the invention which is usable in the arrangement of FIG. 5.

FIG. 6 is a block diagram of transmitter 518 of FIG. 5. In FIG. 6, a laser diode 610 produces light in response to electrical current supplied over a conductor 612. A first portion of the light (illustrated as 614 in FIG. 6) is coupled to fiber optic cable 514 (FIG. 5) and to FO cable 14a. Another portion of the light generated by laser diode 610, and illustrated as 616 in FIG. 6, is coupled to a monitor photodiode 618. Laser diode 610 is thermally connected to a thermoelectric cooling module 620 and to a thermistor 622. Laser diode 610, monitor photodiode 618, thermoelectric module 620 and thermistor 622 may be packaged together as known to form a laser package, illustrated by dotted outline 624. Laser package 624 may be, for example, a commercially available package, such as type C86041E, manufactured by RCA Corporation. Thermoelectric module 620 and thermistor 622 are coupled to a temperature controller 626 which controls the energization of module 620 in response to the temperature indicated by thermistor 622 in known fashion to stabilize the temperature of laser diode 610. Temperature controller 626 also produces an Inhibit signal on a conductor 628 if the indicated temperature of the laser diode is beyond preset limits.

Monitor photodiode 618 produces a signal in response to light incident from laser diode 610, which is coupled to a feedback amplifier 630. Amplifier 630 applies a signal representative of the amount of light received by photodiode 618 to an automatic bias refresh control circuit illustrated as a block 632. This signal is used as described below to set the knee bias of the laser diode after each data transmission.

Laser diode 610 receives current over conductor 612 from a bias current setting means such as a programmable current generating means for example bias current source 634 which produces a bias current ($I_B$) on a conductor 635 which is gated to conductor 612 by a controllable bias switch 636. A modulation current source 638 under control of a manual adjustment represented as a potentiometer 640 produces modulation current ($I_M$) on a conductor 641 which is applied to conductor 612 by a controllable modulator switch 642. Modulator switch 642 is turned on and off (rendered conductive and nonconductive) by first and second logic levels of data received over conductor 524 from data processor 520 of FIG. 5.

Bias switch 636 is turned on and off in one mode of operation by an extended bias control signal which is applied over a conductor 644 from control circuit 632. This control circuit may serve as an enable signal generating means and provies both a pre bias generating means for generating an enable signal having a duration coextensive with the data transmission and an additional time delay means for generating an additional enable signal which extends after the expiration of the data transmission. Further, it may be considered that the enable signal generating means in conjunction with the bias switch provides a means for inhibiting the current provided by the has current source. When bias switch 636 is turned on, current $I_B$ flows from current source 634 to conductor 612 and to laser diode 610. When modulator switch 642 is turned on, current $I_M$ flows from current source 638 to conductor 612 and to laser diode 610. As known, the output impedance of a current source is high, so that current $I_B$ does not flow into current source 638 when both switches 636 and 642 are conductive, and current $I_M$ does not flow into current source 634 when the switches are conductive. Thus, the current flowing on current 612 to laser diode 610 is either bias current $I_B$ (when switch 636 is on) or the sum of the bias and modulating currents ($I_B + I_M$) when both switches are on.

FIG. 7a illustrates the current-versus-light intensity characteristic of laser diode 610. In FIG. 7a, characteristic 710 includes a first portion 712 extending from a total current ($I_T$) of zero to a bias current $I_B$ in which the slope or rate of increase of light intensity as a function of incremental total current is relatively low, and a second portion 714 extending from a bias current of $I_B$ to a peak current $I_P$ (which is the sum of bias current $I_B$ and the peak value of modulating current IM) in which the rate of increase of light intensity for an incremental change of total current is relatively large. There is a transition region 716 between portions 712 and 714 of characteristic 710 known as a "knee" region, in which the slope of the characteristic changes rapidly.

Dotted characteristic 720 of FIG. 7a illustrates in exaggerated form a type of change of the laser diode characteristic which occurs under the influence of time or temperature changes. As illustrated, curve 720 includes a portion 722 which continues the slope of portion 712 of characteristic 710. The "knee" region occurs at a higher current level than current $I_B$, and curve 720 includes a further portion 724 having a slope parallel to that of portion 714 of characteristic 710. The net effect of the change from characteristic 710 to 720, as illustrated, is to reposition the knee substantially midway between currents $I_B$ and $I_P$.

FIG. 7b illustrates the total current 726, including bias currents and modulation currents, which are applied to the characteristic of FIG. 7a. In FIG. 7b, the total current is at the bias current level beginning at a time T0, and a peak current $I_P$ is applied during a data interval including a time T1. As illustrated by curve 730 of FIG. 7c, the result of applying current 726 to a laser diode having a characteristic such as 710 of FIG. 7a results in a substantially square-edged light pulse having a light intensity which varies between values of L1 and L2 in response to the modulating current. Dotted characteristic 732 of FIG. 7c illustrates the light output resulting from application of current 726 to a laser diode having the modified characteristic 720 of FIG. 7a. As illustrated, the peak light output is reduced from L1 to L3. Furthermore, the leading light pulse edges tend to be delayed as illustrated, because the modulating current $I_M$ takes excursions through the knee portion of modified characteristic 720 of FIG. 7a. The reduced light intensity of curve 732 and its delayed transitions are undesirable in a communications system, and are particularly undesirable for a high data rate system. It might be thought that, since the peak light intensity has changed, that the proper correction requires an increase in modulating current $I_M$ to restore the peak light intensity. However, this solution is undesirable because of thermal effects, and does not solve the problem of delayed data transitions. It has been found to be desirable to correct for changes in the light-versus-current characteristic by adjusting bias current $I_B$.

Figure 8:
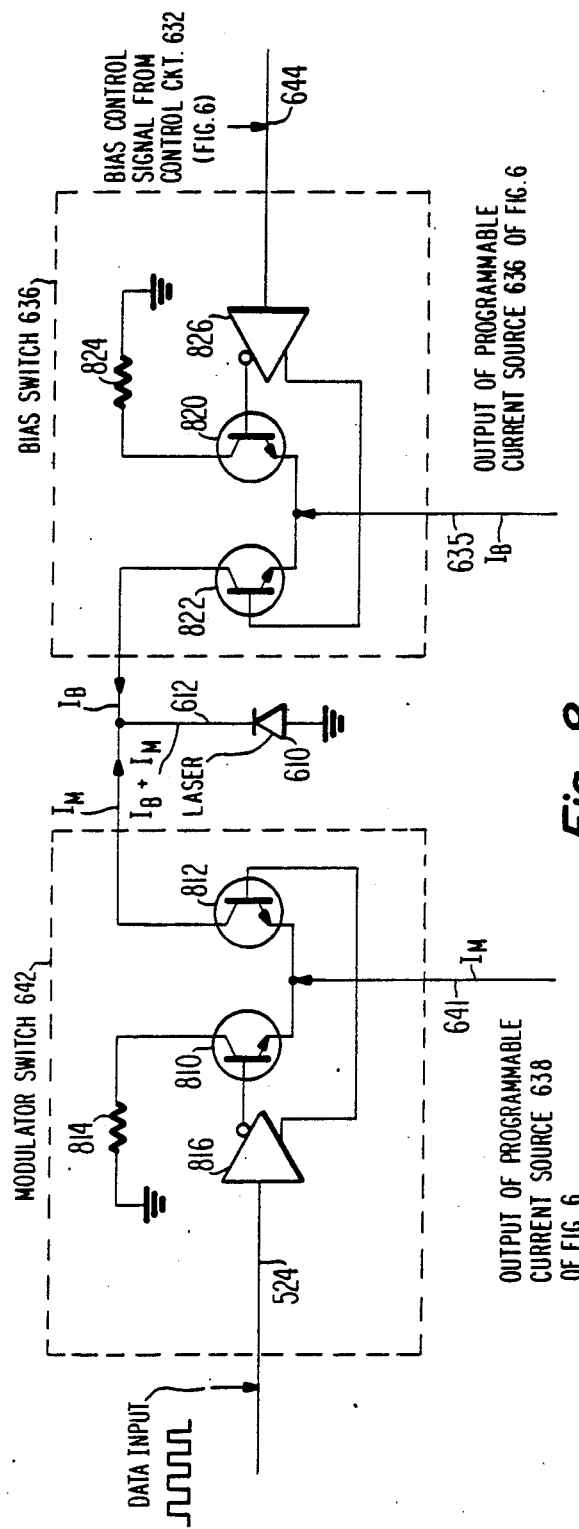
FIG. 8 is a schematic diagram of modulation and bias current switches useful in the arrangement of FIG. 6.

FIG. 8 is schematic diagram illustrating details of bias switch 636 and modulator switch 642 of FIG. 6. In FIG. 8, elements corresponding to those of FIG. 6 are designated by the same reference numeral. In FIG. 8, modulator switch 642 includes a pair of bipolar transistor 810 and 812, the emitters which are coupled to conductor 641 for receiving modulating current $I_M$ from current source 638 of FIG. 6. The collector of transistor 810 is connected by way of a resistor 814 to a reference potential illustrated as ground, and the collector of transistor 812 is connected by conductor 612 to the cathode of laser diode 610. The data is coupled from conductor 524 to the base of transistor 812 by way of the noninverting output of an amplifier 816, and by way of the inverting output of amplifier 816 to the base of transistor 810 without appreciable relative delay. Such an arrangement alternately enables transistors 810 and 812 in response to data transitions, thereby switching current $I_M$ from load 814 to conductor 612, as transistor 810 alternates conduction with transistor 812.

Bias switch 636 as illustrated in FIG. 8 also includes a pair of emitter-coupled bipolar transistors 820, 822, which are coupled to conductor 635 to receive bias current $I_B$ from current source 636 of FIG. 6. The collector of transistor 820 is connected to a resistor load 824, and the collector of transistor 822 is connected to conductor 612. The control signal is coupled to the base of transistor 822 from conductor 644 by way of the noninverting output of an amplifier 826, and is coupled by way of the inverting output of amplifier 826 to the base of transistor 820. The arrangement of bias switch 636 responds to a bilevel control signal on conductor 644 for switching current $I_B$ from source 636 alternately to load 824 or conductor 612 as transistors 820 and 822 are alternately enabled.

FIGS. 9a-9f illustrate data and bias control signals, and the resulting laser currents. In FIG. 9a, 924 represents an arbitrary data signal burst which may be applied over conductor 524 to modulator switch 642 (FIG. 6). Data burst 924 begins at a time T2 and extends to a time T3, and 912 of FIG. 9b illustrates the resulting modulation current $I_M$ on conductor 612, ranging from a magnitude of zero to a magnitude of $I_M$. A prebias control signal 940 of FIG. 9c makes a step increase at a time T1, which is a time $\Delta T$ before the time of the beginning of the first data pulse of burst 924. An extended bias control signal illustrated as 939 of FIG. 9d for controlling bias switch 636 (FIG. 6) also begins at time T1, but extends past time T3 to a later time T5. FIG. 9e represents as 916 the bias current $I_B$ resulting from extended bias control signal 939. As illustrated, current $I_B$ follows the step increase of the extended bias control signal 939 at time T1, and continues at a high level until time T5, well after the end time T3 of data burst 912. At a time T4 occurring between times T3 and T5, bias current $I_B$ may make a step change in amplitude, as described below. The sum of bias current $I_B$ and modulation current $I_M$ is illustrated as total laser current $(I_B+I_M)$ 918 of FIG. 9f.

Figure 10:
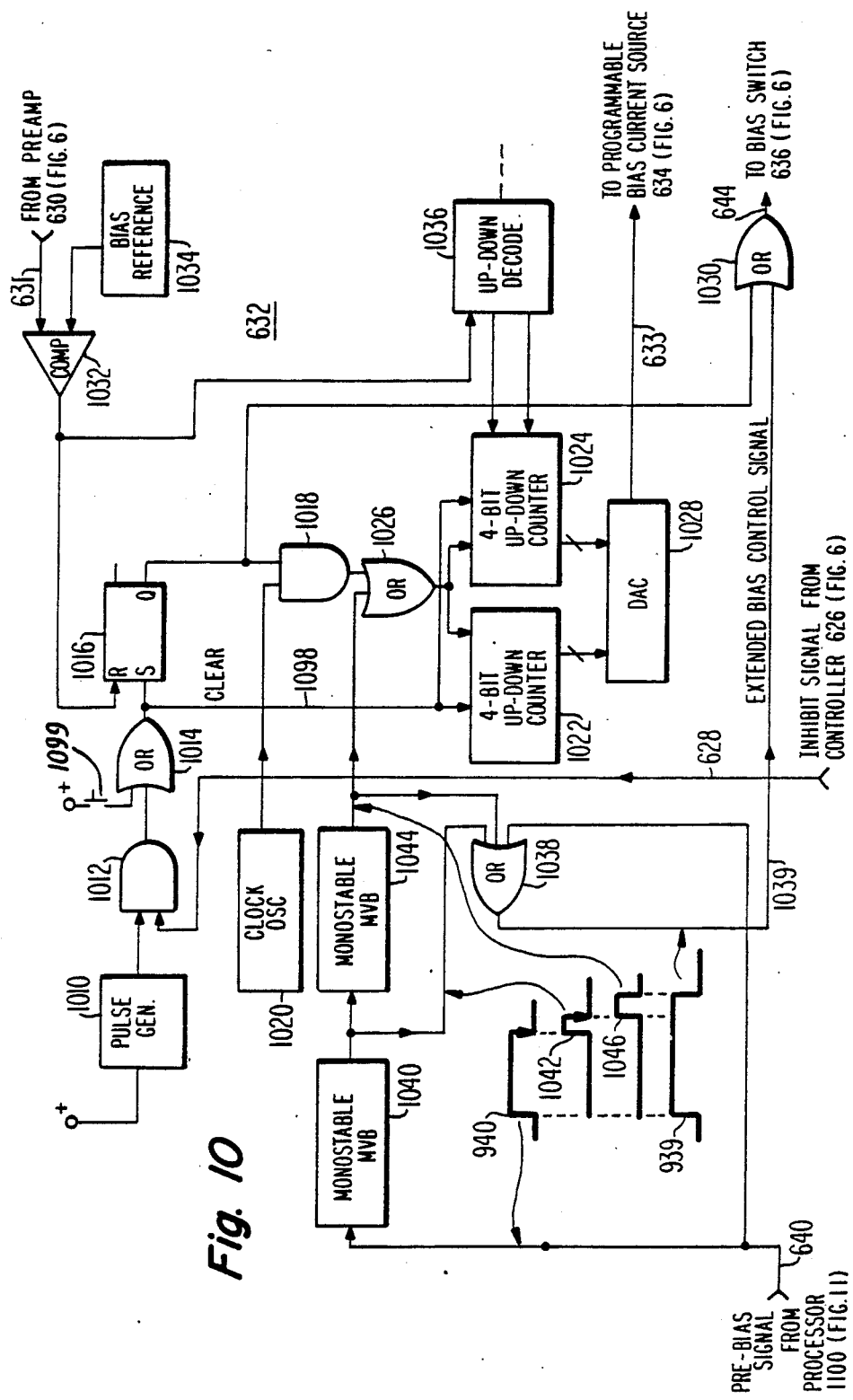
FIG. 10 is a block diagram of an automatic bias refresh control circuit according to the invention which is useful in the arrangement of FIG. 6.

FIG. 10 is a block diagram illustrating details of automatic refresh control circuit 632 of FIG. 6. Elements of FIG. 10 corresponding to those of FIG. 6 are designated by the same reference numeral. The arrangement of FIG. 10 operates in two generally similar modes. At initial turn-on, or under control of a manual switch, the bias current is set to zero and then begins to increase until it reaches a predetermined level. Thereafter, in a second mode of operation, an adjustment is made towards the desired bias immediately following each data transmission.

In FIG. 10, a pulse generator 1010 produces a transition to a logic high level when the supply voltage reaches a suitable level after initial turn-on thereby serving as an initial pulse generating means. The logic high level is applied to an AND gate 1012. A second input of AND gate 1012 receives the Inhibit signal applied over conductor 628 from temperature controller 626 of FIG. 6. Until the Inhibit signal becomes a logic high, AND gate 1012 is inhibited. When the temperature controller produces a logic high Inhibit signal, indicating that the laser diode temperature has stabilized, AND gate 1012 couples a logic high level through an OR gate 1014 to the set (S) input of an RS flip-flop (FF) 1016 and to the clear input terminals of 4 bit up-down counters 1022 and 1024. This provides an initial counter setting means for setting the magnitude of the bias current. The Q output of FF 1016 is coupled through an OR gate 1030 to conductor 644 to enable bias switch 636 (FIG. 6), and is also coupled to an input terminal of an AND gate 1018. And gate 1018 also receives clock pulses from a clock oscillator 1020. With counters 1022 and 1024 cleared, the bias current applied to laser diode 610 (FIG. 6) is zero and its light output is therefore zero. As described below, this results in the enabling of up-down counters 1022 and 1024 for counting up. AND gate 1018 is enabled by the output of FF 1016 and passes clock pulses from oscillator 1020 through an OR gate 1026 to the clock input terminals of counters 1022 and 1024. The clock pulses gated through AND gate 1018 and OR gate 1026 cause counters 1022 and 1024 to progressively increase their count. The count of counters 1022 and 1024 is applied as inputs to a digital-to-analog converter (DAC) 1028 which produces in response a quantized analog voltage on conductor 633 which increases with time. The analog voltage is applied to conductor 633 to cause an increase in the bias current produced by current source 634 (FIG. 6). The bias current produced by current source 634 of FIG. 6 is coupled through enabled bias switch 636 of FIG. 6 to cause an increasing bias current in laser diode 610. As mentioned, this causes a signal to be generated by preamp 630 which represents the amount of light received by monitor photodiode 618 (FIG. 6).

As the count of counter 1022 and 1024 progressively increases, and the bias current produced by current source 634 (FIG. 6) through laser diode 610 also increases, laser diode 610 produces an increasing amount of light, part of which is coupled to monitor photodiode 618. Photodiode 618 produces a signal which is amplified by amplifier 630 and applied over conductor 631 to an input terminal of a comparator 1032 (FIG. 10). Comparator 1032 compares the signal received from conductor 631 with a reference voltage produced by a bias reference source 1034. When the amount of light produced by laser diode 610 corresponds to the amount of light known to be produced at the correct knee bias level, the signal received by comparator 1032 from conductor 631 will equal the reference bias produced by source 1034. At this time, the output signal of comparator 1032 makes a transition, which is coupled to the reset (R) input terminal of FF 1016. FF 1016 becomes reset, and its Q output disables AND gate 1018, thereby stopping the flow of clock pulses from oscillator 1020 to counters 1022 and 1024, and also disabling bias switch 636 (FIG. 6). In the absence of further clock pulses, the count of counters 1022 and 1024 remains fixed, and is a digital representation of the value of the bias current required by laser diode 610 when operated at the knee of its characteristic. The described setting of bias current may also be initiated by setting FF 1016 by means of a manual push button switch 1099.

Figure 9:
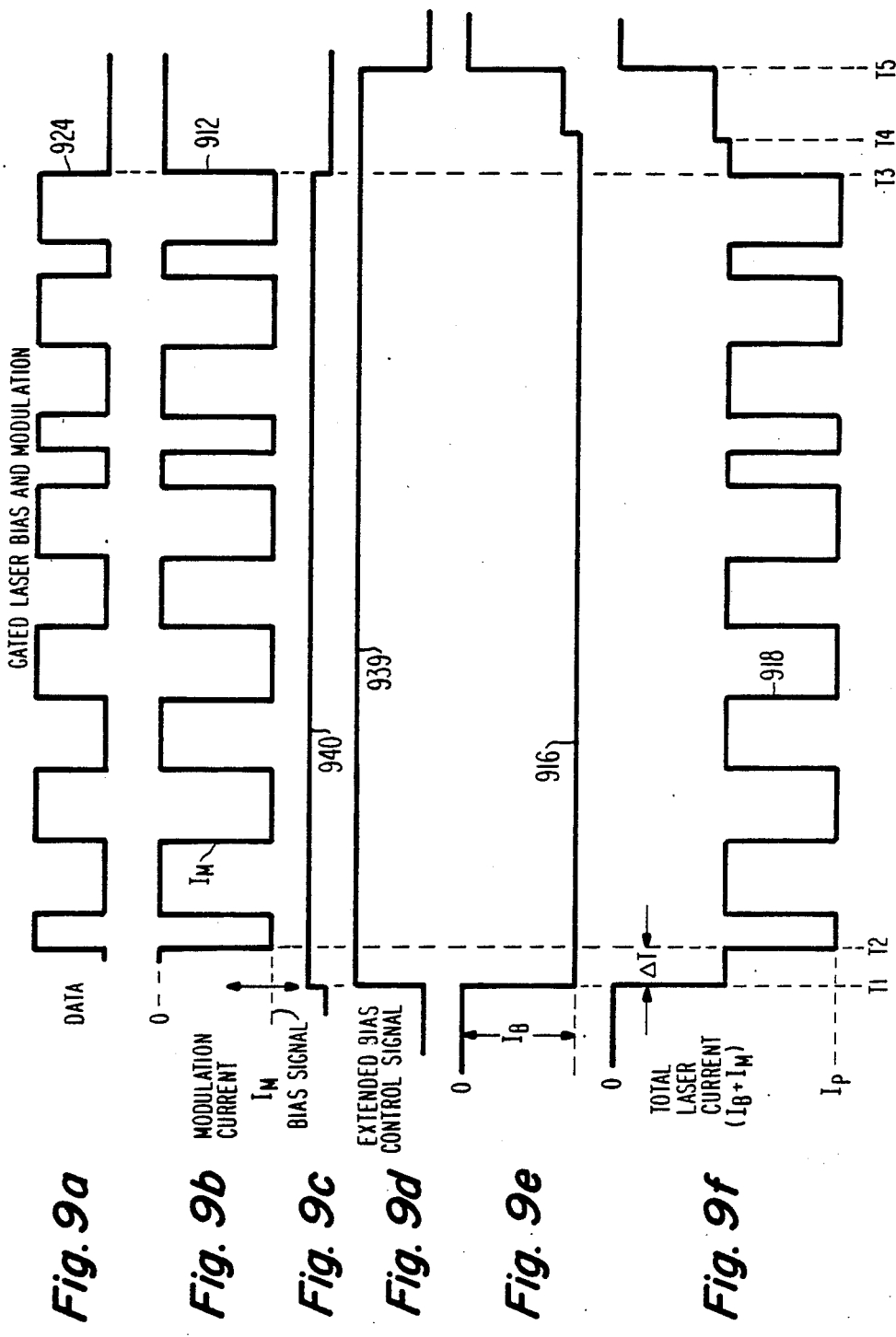
FIGS. 9a-9f illustrate amplitude versus time diagrams of certain data and control signals, and of the total laser current and of the components thereof in relation to transmission of a data burst.

The remainder of the circuits illustrated in FIG. 10 generate an extended bias control signal and cause a single clock pulse to be applied to counters 1022 and 1024 at the end of each data transmission for causing a single-step correction of the knee bias current. Prebias control signal 940 of FIG. 9 is coupled by way of a conductor 640 to an input of an OR gate 1038 (FIG. 10) and to the trigger input of a monostable multivibrator (MVB) 1040. As mentioned above and as described in more detail below, prebias control signal 940 takes a logic high level a short time before data transmission begins. The prebias control signal is coupled through OR gate 1038 to OR gate 644 to bias switch 636 (FIG. 6) into conduction for applying bias current to laser diode 610 in readiness for data transmission. The magnitude of the bias current is established by the count stored in counters 1022 and 1024. As also mentioned, prebias control signal 940 ends concurrently with the last data pulse. The negative-going transition on the trailing edge of pulse 940 triggers MVB 1040 to produce a pulse illustrated as 1042 in FIG. 10, which is applied to another input of OR gate 1038. Pulse 1042 maintains the output of OR gate 1038 at a logic high level for a time selected to allow the bias circuits to settle after the data transmission. This time is approximately 400 nanoseconds. The negative-going trailing edge of pulse 1042 is also applied to a further MVB 1044, which produces another pulse, illustrated in FIG. 10 as 1046, having a duration of approximately 400 nanoseconds, which is also applied to an input of OR gate 1038 for further extending the duration of pulse 940 to produce an extended bias control signal (illustrated as 939 in FIG. 10) on conductor 1039. Pulse 1046 is also applied by way of OR gate 1026 to the clock input terminals of counters 1022 and 1024. The leading edge of pulse 1046 clocks counters 1022 and 1024, causing them to increment or decrement by one count, corresponding to one bit. The direction of the count is established by the condition of the output signal of comparator 1032 at the moment the count occurs. If the output of comparator 1032 indicates that the amount of light produced by the laser diode is low, up-down decode block 1036 causes counters 1022 and 1024 to be enabled for incrementing the count, whereas if comparator 1032 indicates that excessive light is being produced, decoder 1036 enables counters 1032 and 1034 for decrementing the count. Thus, after each data transmission, counters 1022 and 1024 are clocked once to increment or decrement the count and thereby increase or decrease the bias current by one bit in the direction required for the proper knee current.

Figure 11:
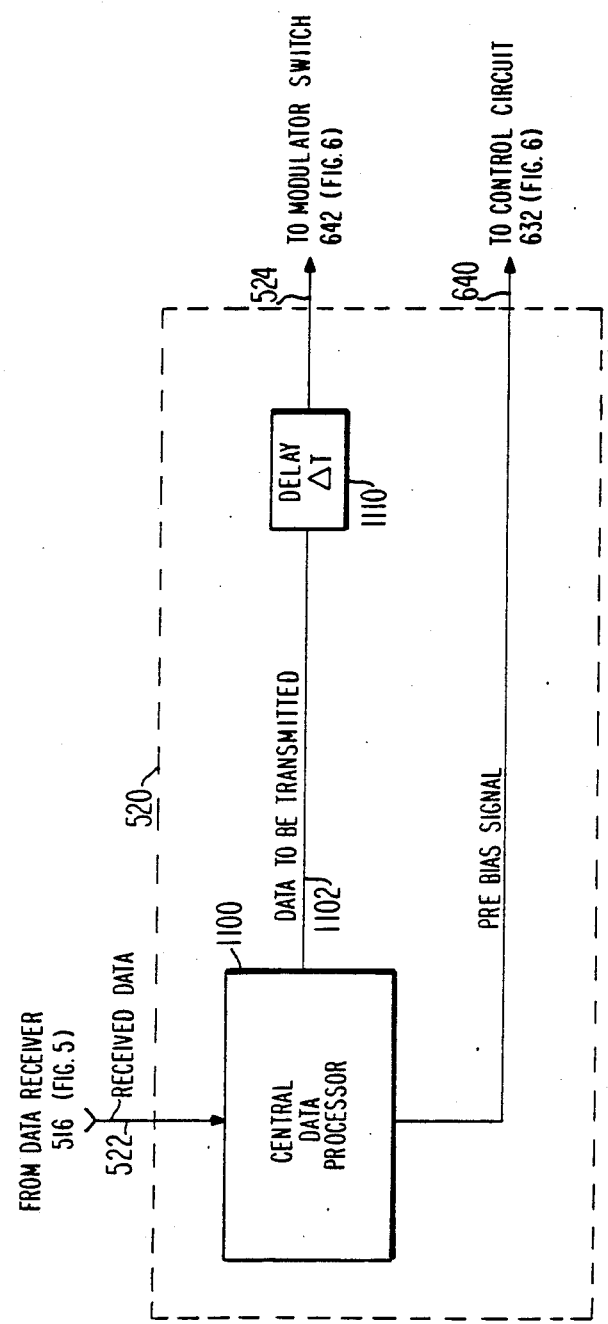
FIG. 11. is a diagram, partially in block and partially in schematic form, of a data receiver adapted for use in conjunction with the transmitter of FIG. 6 in an arrangement such that of FIG. 5.

FIG. 11 illustrates the source of the prebias signal and the data signal. In FIG. 11, elements corresponding to those of the other FIGURES are designated by the same reference numerals. In FIG. 11, data processor 520 receives data over conductor 522 from data receiver 516 of FIG. 5, and applies it to a central data processor 1100. Processor 1100 examines the address of received signals, ignores those messages addressed to other nodes, operates upon messages addressed to its own node, and recognizes end-of-transmission portions of incoming messages to decide when its own transmission should occur, all in known fashion. It simultaneously generates data to be transmitted on a conductor 1102 and the prebias signal 940 on a conductor 640. The data to be transmitted is applied from conductor 1102 to a delay element 1110 having a delay of ΔT for producing on conductor 524 data which begins at a time ΔT after the beginning of the prebias signal. The delayed data on conductor 524 and the prebias signal on conductor 640 are applied to modulator switch 642 of FIG. 6 and to control circuit 632 of FIG. 6, respectively.

Figure 12:
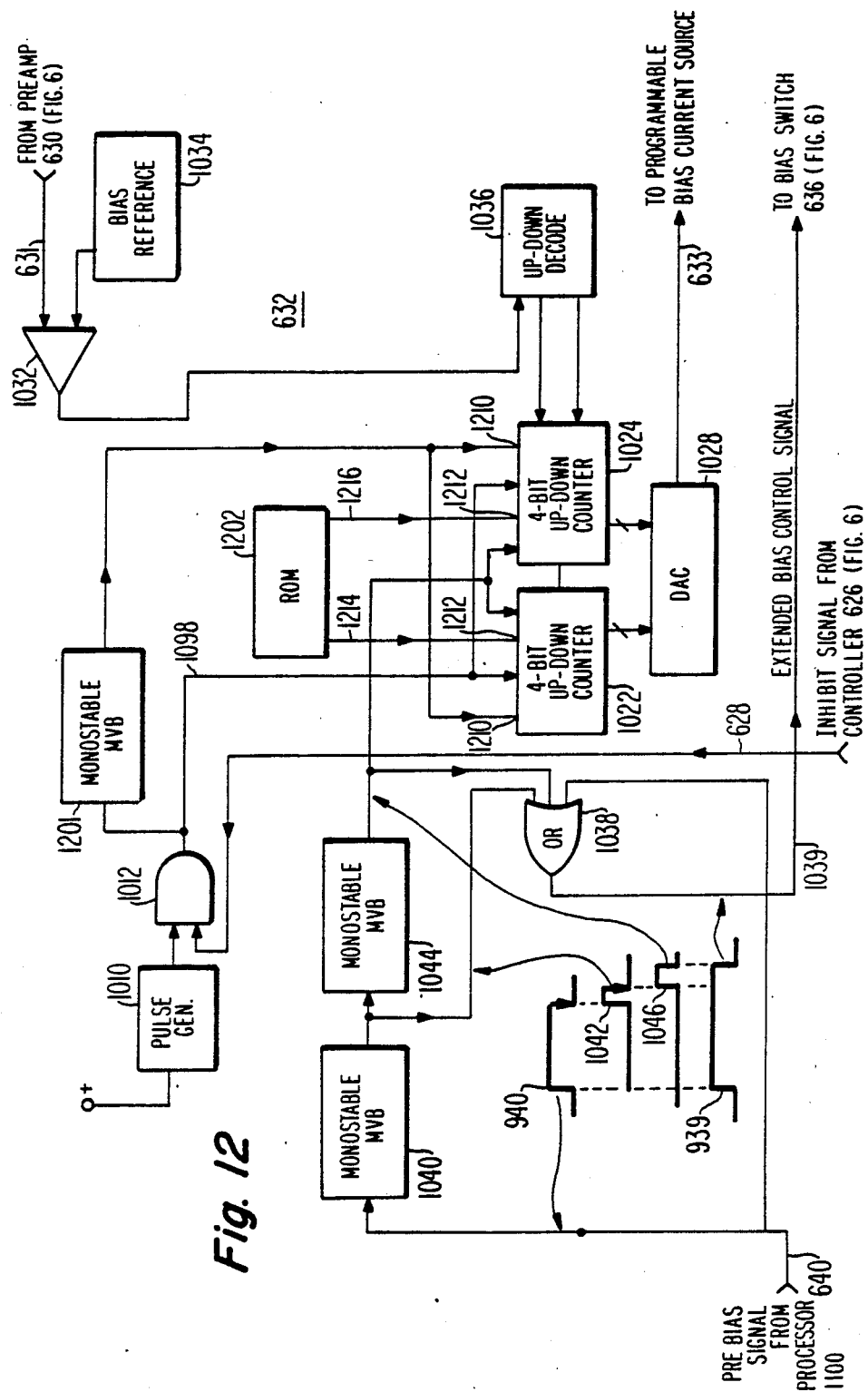
FIG. 12 is a diagram of an alterative control circuit using a memory element to establish initial laser operating parameters.

FIG. 12 illustrates an alternate circuit which may be used for control circuit 632 of FIG. 6. In the arrangement of FIG. 12, the initial set up of the bias current is accomplished by the use of a read only memory (ROM) which is preprogrammed with a word representing the desired knee current. FIG. 12 is similar to FIG. 10, and elements of FIG. 12 corresponding to those of FIG. 10 are designated by the same reference number. In FIG. 10, counters 1022 and 1024 are type SNLS 193, which include a parallel load command input terminal 1210 and parallel loading ports designated 1212. A ROM 1202 stores an 8-bit number representing the desired value of bias current at the temperature setting of temperature controller 626 (FIG. 6) at the time of manufacture of the unit. The 8-bit number is coupled from ROM 1202 by conductor sets 1214 and 1216 (four bits per conductor set) and applied therefrom to parallel input ports 1212 of counters 1022 and 1024, respectively. A monostable multivibrator 1201 is coupled to the output of AND gate 1012 and forms part of a presetting means for setting the counters 1022 and 1024. At either initial turn-on or after initial turn-on when the Inhibit signal on conductor 628 goes logic high as described in conjunction with FIG. 10, AND gate 1012 produces a pulse, which is coupled by conductor 1098 to clear counters 1022 and 1024, and which triggers multivibrator 1201 into its astable state. A moment later, multivibrator 1201 produces a pulse which is applied to input terminals 1210 of counters 1022 and 1024 to enable the parallel loading function, whereupon the word stored in ROM 1202 is loaded into counters 1022 and 1024. Thereafter, counters 1022 and 1024 are incremented and decremented by one bit after each data transmission, as described in conjunction with FIG. 10. A disadvantage of the arrangement of FIG. 12 is that the word stored in ROM 1202 becomes progressively less representative of the correct knee current as the laser diode ages. This may require ROM 1202 to be updated periodically.

Figure 13:
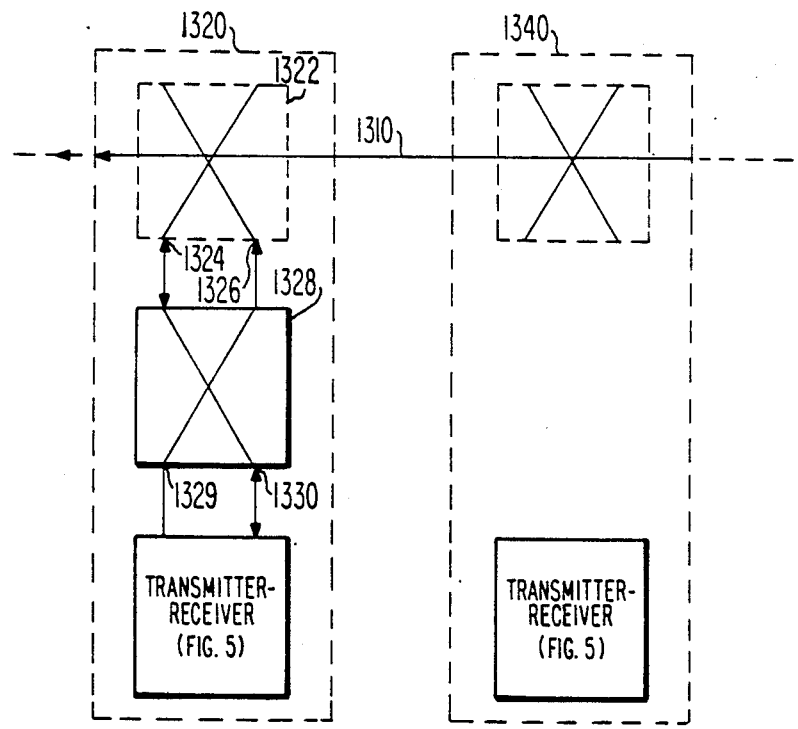
FIG. 13 is a block diagram illustrating a bus type of communication system.

FIG. 13 illustrates another type of fiber optic communications system which with the invention may be used. In FIG. 13, a fiber optic bus 1310 supports bidirectional communications among a plurality of nodes, only two of which (1320, 1340) are shown. Node 1320 is taken as representative. A star coupler 1322 is coupled to FO bus 1310 and includes a first output port 1324 for communicating with a portion of the FO bus 1310 to the right (as illustrated in FIG. 13) of node 1320, and which also includes a further FO port 1326 for communicating with those portions of FO bus 1310 to the left of node 1320. The signals from ports 1324 and 1326 are applied to a further star coupler 1328 in which the signals are combined to produce at ports 1329 and 1330 bidirectional communications with the entirety of fiber optic bus 1310. An arrangement similar to that of FIG. 5 is coupled to ports 1329 and 1330, with FO cable 512 coupled to port 1329 and FO cable 514 coupled to FO port 1330.

Other embodiments of the invention will be apparent to those skilled in the art. For example, the information carried on the local area network may include analog data such as video, either amplitude-modulated or pulse-modulated (PAM, PWM, PFM, etc). Since there are no signals being received during the setting of the bias on a LAN operating in a burst mode as described, the peak modulating current may also be automatically set after the setting of the knee bias current, if desired.

What is claimed is:

1. A knee bias control circuit for a light emitting device, for a data transmitter adapted for burst communications in a local area fiber optic communications system, wherein said light emitting device has a light-versus-drive-current characteristic including a first portion in which the light emitted as a function of drive current increases relatively slowly from zero to a first level which occurs at a knee point, and also including a second portion in wich the light emitted as a function of drive current increases relatively quickly for drive currents exceeding the drive current correponding to said knee point, said ciruit comprising:

a controllable bias current source coupled to the light emitting device for applying bias current thereto, said controllable bias current source being enabled in response to an enable signal applied to a bias current enable terminal of said current source, the magnitude of said bias current supplied by said current source is established in response to a magnitude signal applied to a magnitude input terminal of said current source;

a source of burst digital data signals;

enable signal generating means coupled to said source of signals and to said controllable bias current source for generating said enable signal during an interval equal to the sum of the duration of said burst digital data and an additional time and for applying said enable signal to said enable terminal of said controllable bias current source, whereby bias signal is applied to said light emitting device during the time said burst digital data signals are transmitted but said bias current is not applied to said light emitting device during most of the time between bursts of said burst digital data signal, which reduces residual light in said local area fiber optic communications system and noise resulting therefrom; and bias current setting means coupled to said enable signal generating means and to said controllable bias current source for generating said magnitude signal, for updating said magnitude signal during said additonal time and for applying said magnitude signal to magnitude input terminal of said controllable bias current source, whereby said residual noise on said local area system is reduced, and the bias point of each data transmitter is reset without significant effect on the noise of the system.

2. A circuit according to claim 1 in which said light emitting device is a laser diode.

3. A circuit according to claim 2 in which said controllable bias current source comprises:

digitally controllable current generating means responsive to said magnitude signal for generating said bias current at an output terminal; and switching means coupled to said output terminal of said digitally controllable current generating means, to said laser diode and to said enable terminal for coupling said bias current from said digitally controllable current generating means to said laser diode under control of said enable signal.

4. A circuit according to claim 2 wherein said enable signal generating means comprises:

prebias generating means coupled to said source of burst digital data signals for generating a prebias control signal having a duration coextensive with said burst digital data signals; and additional time delay means coupled to said prebias generating means for generating at least a portion of said enable signal.

5. A circuit according to claim 4 wherein said additional time delay means comprises:

pulse generating means coupled to said prebias generating means for being triggerd by the lagging edge of said prebias control signal for generating at least one further pulse; and OR gating means coupled to said prebias generating means, to said pulse generating means and to said enable terminal for generating said enable signal during said prebias control signal and during said further pulse and for applying said enable signal to said enable terminal of said switch means.

6. A circuit according to claim 5 wherein said bias current setting means comprises:

up-down counting means including a clock input terminal and an up-down control input, and also including output terminals at which said magnitude signal is generated;

comparison means coupled to said laser diode and to said up-down control input of said up-down counting means for sensing the light output of said laser diode and comparing it with a standard, and for generating an up signal when said light output of said laser diode is below said standard and for generating a down signal when said light output of said laser diode is above said standard for enabling said up-down counting means for counting up when said light output is below said standard, and for enabling said up-down counting means for counting down when said light output is above said standard; and means for clocking the up-down counting means coupled to said clock input terminal of said up-down counting means for clocking said up-down counting means in response to said further pulse for causing said up-down counting means to step by one bit following each burst digital data signal.

7. A circuit according to claim 6 further comprising initial counter setting means coupled to said up-down counting means for setting said magnitude signal at times other than those times when said additional pulse occurs.

8. A circuit according to claim 7 wherein said initial counter setting means comprises:
   initial pulse generating means for generating an initial pulse at times other than those times when said further pulse occurs;
   second coupling means coupled to said initial pulse generating means and to said up-down counting means for clearing said up-down counting means whereby said magnitude signal becomes zero;
   a flip-flop coupled to said initial pulse generating means for receiving said initial pulse for being set thereby for generating an initial gating signal, said flip-flop also including a reset terminal;
   gated clock generating means coupled to said flip-flop and to said clock input terminal of said up-down counting means for applying clock signals to said counting means during said initial gating signal;
   third coupling means coupled to said flip-flop and to said OR gating means for coupling said initial gating signal to said OR gating means for generating said enable signal, whereby said controllable bias current source produces insufficient bias signal to cause said laser diode to produce said standard amount of light, and said comparison means therefore conditions said up-down counting means for counting up; and
   fourth coupling means coupled to said comparison means and to said reset input terminal of said flip-flop for resetting said flip-flop when said laser diode produces said standard amount of light, whereby said initial gating signal ceases, said gated clock generating means is disabled, and said up-down counting means stores said magnitude signal.

9. A circuit according to claim 7 wherein said initial counter setting means comprises:
   memory means for storing a signal representative of a nominal bias current; and
   presetting means coupled to said memory means and to said up-down counting means for presetting said up-down counting means to a state wherein said magnitude signal corresponds to said nominal bias current.

10. A circuit according to claim 9 wherein said presetting means comprises:
    initial pulse generating means for generating an initial pulse at times other than those times when said further pulse occurs;
    second coupling means coupled to said initial pulse generating means and to said up-down counting means for coupling said initial pulse to said up-down counting means for clearing the count therefrom;
    third coupling means coupled to said memory means and to said up-down counting means for applying said signal representative of a nominal bias current to said up-down counting means;
    delay means coupled to said initial pulse generating means and to up-down counting means for presetting said up-down counting means with said signal representative of a nominal bias current at a time after said initial pulse.

11. An improved local area fiber optic communication system for transmitting bursts of data from any one of a first plurality of transmitters to any one of a second plurality of receivers, said system comprising:
    a light emitting device associated with each transmitter of said system for producing light which is amplitude modulated with said data, each said light emitting device having a light-versus-drive-current characteristic including a first region extending from zero current to a knee current in which the incremental light output in response to an incremental drive current is relatively small, and a second region extending from said knee current to a maximum drive current in which the incremental light output in response to an incremental drive current is relatively great, said knee current changing with time;
    controllable bias current means associated with each said transmitter and coupled to said light emitting device for generating knee current in said light emitting device for biasing said light emitting device to the threshold of emission whereby those light emitting devices which are not transmitting data generate light in response to the knee currents which raises the residual light level of the fiber optic communiation system and thereby increases its noise floor;
    a source, associated with each transmitter, of data to be transmitted in bursts
    modulating means coupled to said light emitting device of eah said transmitter and to the associated source of data for modulating said drive current between said knee current and said maximum drive current in response to a logic level of the data to be transmitted;
    inhibiting means at each said transmitter coupled to said controllable bias current means for inhibiting said controllable bias current means for an interval occurring between said data bursts transmitted by the associated transmitter, whereby said noise floor of said system is reduced;
    wherein the improvement lies in an arrangement for correcting for time-dependent variation in said knee current of each light-emitting device, said improvement lying in that said interval during which each inhibiting means inhibits said controllable bias means has a shorter duration than said interval between said data bursts, thereby defining an idling time during which said device is energized with said knee current but data is not being transmitted; and further comprises
    bias control means associated with each said transmitter and coupled to said controllable bias current means and to said inhibiting means for setting the value of said bias current during said idling time.

12. A system according to claim 11 wherein said light emitting device is a laser diode.

13. A system according to claim 11 wherein said bias control means comprises:
    controllable up-down counting means coupled to said controllable bias current means for generating a control signal for said controllable bias current means;
    sensing means coupled to said light emitting device and to said up-down counting means for comparing the light produced by said light emitting device with a standard level for generating a bilevel signal indicating that said light is greater or less than said standard level and for conditioning said up-down counting means for counting up or down response to said bilevel signal; and clock pulse generating means coupled to said controllable up-down counting means for clocking said controllable up-down counting means during said idling time for adjusting said bias current in a direction which causes said light produced by said light emitting device to approach a value providing said standard level.

14. A method for communicating on a fiber optic communications system including a fiber optic bus, a plurality of optical receivers and a plurality of optical transmitters, each of which includes a light emitting device having a light-versus-drive-current characteristic including a first region extending from zero current to a knee current in which the incremental light output in response to an incremental drive current is relatively small, and a second region extending from said knee current to a maximum drive current in which the incremental light output in response to an incremental drive current is relatively great, said knee current changing with time, the method comprising the steps of:

at each transmitter, receiving data for transmission in bursts having a duration;

selecting a transmission time for transmitting said data;

at each transmitter, generating a knee bias signal having a duration extending from at least a first time at which transmission of said data begins and extending continuously until a second time later than the time that transmission of said data ends, the interval between said time that transmission of said data ends and said second time including a refresh time;

at each transmitter, applying knee bias to said light emitting device in the interval between said first and second times in a magnitude established by a stored knee amplitude signal;

during said refresh time, comparing the light output of said light emitting device with a standard; and during said refresh time, stepping said stored knee amplitude signal in a direction which causes said light output to approach said standard.

* * * * *